US009615296B2

(12) United States Patent
Ryan et al.

(10) Patent No.: US 9,615,296 B2
(45) Date of Patent: Apr. 4, 2017

(54) SYSTEM AND METHOD FOR SCRAMBLING CODE ASSOCIATION

(71) Applicant: Eden Rock Communications, LLC, Bothell, WA (US)

(72) Inventors: Dave Ryan, Bothell, WA (US); Anthony Wong, Bothell, WA (US); Eamonn Gormley, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/072,646

(22) Filed: Nov. 5, 2013

(65) Prior Publication Data
US 2014/0213263 A1    Jul. 31, 2014

Related U.S. Application Data

(60) Provisional application No. 61/757,661, filed on Jan. 28, 2013.

(51) Int. Cl.
*H04W 36/00* (2009.01)
*H04W 36/04* (2009.01)
*H04W 48/16* (2009.01)
*H04W 84/04* (2009.01)

(52) U.S. Cl.
CPC ... *H04W 36/0083* (2013.01); *H04W 36/0055* (2013.01); *H04W 36/0061* (2013.01); *H04W 36/04* (2013.01); *H04W 48/16* (2013.01); *H04W 84/045* (2013.01)

(58) Field of Classification Search
None
See application file for complete search history.

(56) References Cited

U.S. PATENT DOCUMENTS

| 5,551,058 | A | 8/1996 | Hutcheson et al. |
| 6,108,650 | A | 8/2000 | Musk et al. |
| 8,320,351 | B2* | 11/2012 | Aqvist .............. H04W 36/0083 370/342 |
| 2003/0031162 | A1 | 2/2003 | Chitrapu et al. |
| 2008/0132239 | A1* | 6/2008 | Khetawat et al. ............ 455/438 |
| 2009/0052504 | A1 | 2/2009 | Tanae |
| 2010/0067371 | A1* | 3/2010 | Gogic et al. .................. 370/216 |

(Continued)

FOREIGN PATENT DOCUMENTS

| WO | WO 2009/006041 A1 | 1/2009 |
| WO | WO 2012/064079 A2 | 5/2012 |
| WO | WO 2012/135121 A1 | 10/2012 |

OTHER PUBLICATIONS

International Search Report and Written Opinion for PCT/US2013/068597, filed Nov. 5, 2013.

(Continued)

*Primary Examiner* — King Poon
*Assistant Examiner* — Vincent Peren

(57) ABSTRACT

A process for associating a cell with a detected scrambling code in a cellular communications network includes receiving cell data associated with the detected scrambling code, determining a set of candidate cells within a predetermined area, evaluating characteristics of each candidate cell of the set of candidate cells, and associating a cell identifier of a first candidate cell of the set of candidate cells with the detected scrambling code based on the evaluated characteristics.

20 Claims, 6 Drawing Sheets

(56) References Cited

U.S. PATENT DOCUMENTS

| | | |
|---|---|---|
| 2010/0069072 A1 | 3/2010 | Gogic et al. |
| 2010/0150109 A1* | 6/2010 | Bradley et al. ............... 370/331 |
| 2010/0203891 A1* | 8/2010 | Nagaraja ............... H04W 36/08 455/436 |
| 2011/0014921 A1* | 1/2011 | Neil ............................. 455/444 |
| 2011/0019638 A1* | 1/2011 | Hamel et al. ................ 370/331 |
| 2011/0171915 A1* | 7/2011 | Gomes et al. .................. 455/73 |
| 2011/0188473 A1* | 8/2011 | Moe et al. .................... 370/331 |
| 2012/0015660 A1* | 1/2012 | Kawaguchi ................... 455/438 |
| 2012/0100851 A1* | 4/2012 | Zheng et al. ................. 455/436 |
| 2012/0100856 A1* | 4/2012 | Ishida et al. ................. 455/436 |
| 2012/0208556 A1 | 8/2012 | Jung et al. |
| 2012/0252457 A1* | 10/2012 | Shindo ......................... 455/436 |
| 2012/0276906 A1* | 11/2012 | Elmdahl et al. ............. 455/437 |
| 2013/0095835 A1* | 4/2013 | Carmon et al. .............. 455/437 |
| 2013/0109380 A1* | 5/2013 | Centonza et al. ............ 455/434 |
| 2013/0143555 A1* | 6/2013 | Singh et al. .................. 455/434 |
| 2014/0004851 A1* | 1/2014 | Fix et al. ...................... 455/425 |
| 2014/0031041 A1* | 1/2014 | Jung et al. .................... 455/437 |
| 2014/0098753 A1* | 4/2014 | Kazmi et al. ................ 370/329 |
| 2014/0128079 A1* | 5/2014 | Soliman et al. ............. 455/437 |
| 2014/0301368 A1* | 10/2014 | Chen et al. ................... 370/331 |

OTHER PUBLICATIONS

Extended European Search Report for European Application No. 13872525.4, dated Sep. 27, 2016.

* cited by examiner

SYSTEM AND METHOD FOR SCRAMBLING CODE ASSOCIATION

CROSS-REFERENCES TO RELATED APPLICATIONS

The present invention claims priority to U.S. Provisional Application No. 61/757,661, filed Jan. 28, 2013, which is incorporated by reference herein for all purposes.

BACKGROUND OF THE INVENTION

Wireless networks rely on a large number of individual cells to provide high capacity wireless services over large coverage areas such as market areas (e.g. cities), surrounding residential areas (e.g. suburbs, counties), highway corridors and rural areas. Continuous radio connectivity across these large coverage areas is accomplished via user mobility from one base station to others as the user traverses the network's operating area. High reliability mobility is an important aspect of mobile wireless networks in order to minimize the number of dropped calls or other abnormal discontinuation of radio service to the supported users.

A key feature of modern multi-base station mobility networks is the creation and maintenance of neighbor lists for each base station within the network. Each base station transmits its list of nearby neighbor cells to mobile devices such that a mobile device can continuously monitor the radio frequencies defined in the list and search for higher quality base stations to which it may handover if and when the mobile device experiences degraded signal quality from its current serving radio base station. In other words, during active call sessions, the mobile device continually monitors quality of its serving base station and scans the frequency and/or scrambling code combinations defined on its current neighbor list searching for suitable quality handover candidates.

If the mobile device finds a higher quality signal coming from a defined neighboring base station during this scanning procedure, it initiates a handover request to the network. If the request is granted, the mobile device connects to the candidate base station in either a hard or soft handover mode depending on the particular radio network technology in question. If the original serving base station's signal quality drops below a defined signal quality threshold the mobile device will be connected entirely to the new base station and the call will continue. Should the serving base station's signal quality degrade below an acceptable level prior to the mobile device scanning and locating a suitable high quality neighboring cell, the call will typically fail and the user will experience a disconnect from the system such as a dropped call.

Each base station maintains its own list of likely neighbor cells and communicates this list via over the air messaging to each mobile station within its coverage area. Mobile stations search this list repeatedly and frequently to support handover operations as described above. Automatic Neighbor Relationship (ANR) management functions can assist with the creation and maintenance of these neighbor lists.

One source of data input to ANR routines comes from Detected Set Reporting (DSR) which includes a summary of mobile equipment base station measurement reports. DSR provides information regarding base station pilot signal strength and signal quality as observed by mobile stations operating within the wireless network. These reports associate signal strength and signal quality measurements with base station CDMA scrambling codes but in general do not associate these metrics with a unique cell identifier. In many cellular systems, the unique cell identifier is a Base Station Identifier code (BSID).

BSIDs are unique throughout the network, but BSIDs are not always associated with scrambling codes in ANR equipment. When data is reported from a UE under a scrambling code that is not associated with a cell on a neighbor list of the UE, the identity of an originating cell may not be known to the ANR equipment. Furthermore, scrambling codes are reused multiple times over large wireless market areas, so it is possible for ANR equipment to receive data from multiple base stations with the same scrambling code, resulting in an ambiguous scrambling code. Therefore, it is desirable to map the detected scrambling code to the correct cell identifier of the cell being measured.

BRIEF SUMMARY OF THE INVENTION

Embodiments of the present invention include a system, method, and computer readable medium for associating unique identifiers with non-unique scrambling codes. Embodiments relate to resolving scrambling codes to unique cell identifiers for support of automatic neighbor list relations management in a spread spectrum wireless network.

In an embodiment, a process of associating a cell with a detected scrambling code in a cellular communications network includes receiving cell data associated with the detected scrambling code, determining a set of candidate cells within a predetermined area, evaluating characteristics of each candidate cell of the set of candidate cells, and associating a cell identifier of a first candidate cell of the set of candidate cells with the detected scrambling code based on the evaluated characteristics. The cell data received for the target cell may be detected set information for a Universal Mobile Telecommunications System (UMTS) cellular network.

Determining the set of candidate cells within the predetermined area may include establishing the predetermined area, and adding each cell that uses the detected scrambling code within the predetermined area to the set of candidate cells. In another embodiment, determining the set of candidate cells within the predetermined area includes establishing a first predetermined area, comparing a number of cells that use the detected scrambling code within the first predetermined area to a predetermined value, when the number of cells that use the detected scrambling code within the first predetermined area is less than the predetermined value, determining a second predetermined area that is larger than the first predetermined area, and adding each cell that uses the detected scrambling code within the second predetermined area to the set of candidate cells.

Evaluating characteristics of each candidate cell of the set of candidate cells may include evaluating one or more criterion related to a probability that a given cell is responsible for the cell data and ranking each cell in the set of candidate cells based on the one or more criterion. The one or more criterion may include a geographic location and antenna characteristics of each candidate cell. In an embodiment, the one or more criterion includes at least one of predicted received energy and predicted received signal quality.

Evaluating characteristics of each candidate cell of the set of candidate cells may include testing a candidate cell of the set of candidate cells by associating a base station identifier (BSID) of the candidate cell with the detected scrambling code on a neighbor list of the target cell. Testing the candidate cell may further include establishing a test time, wherein testing the candidate cell is performed for the test time, and evaluating a handover metric related to handover attempts to the candidate cell, wherein the evaluated characteristics include a result of evaluating the handover metric.

Although embodiments above have been described with respect to a process, aspects of the present invention may be embodied as a system including a processor, a memory, and other physical components. In another embodiment, aspects of the present invention are present on a non-transitory computer readable medium. Persons of skill in the Art will recognize that various additions, subtractions, and substitutions may be made to the examples described herein without departing from the scope and spirit of the invention.

DETAILED DESCRIPTION OF THE INVENTION

Figure 1:
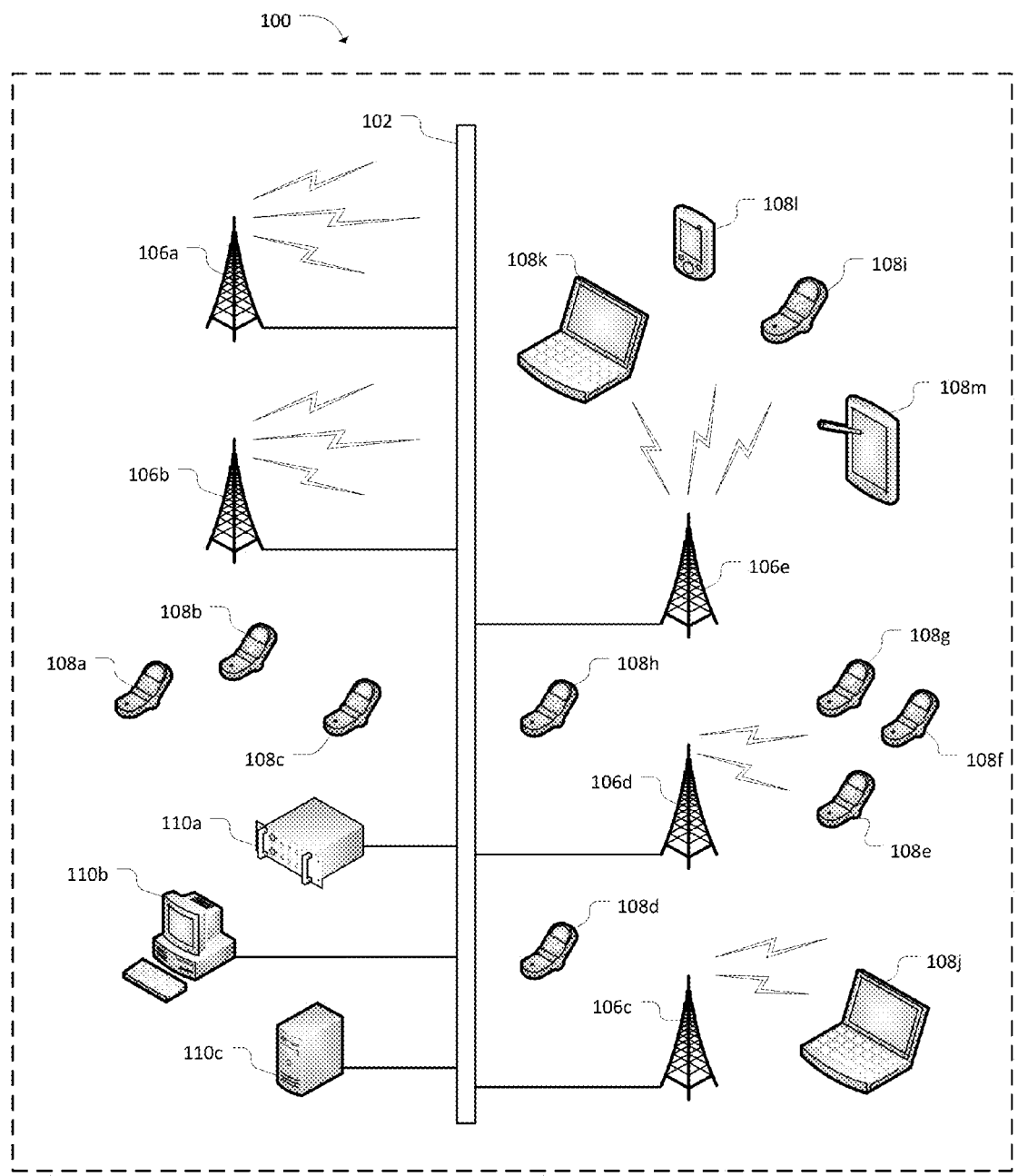
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of the present invention may use correlation of reported scrambling codes to neighbor lists and associated neighbor list metrics from the local and nearby wireless base stations as well as geographic and radio frequency propagation predictions to support base station name resolution for each Detected Set Reporting (DSR) reported scrambling code.

FIG. 1 illustrates an example networked computing system 100 according to an embodiment. As depicted, system 100 includes a data communications network 102, one or more base stations 106a-e, one or more network resource controller 110a-c, and one or more User Equipment (UE) 108a-m. The base stations may be used with macrocells, microcells, picocells, and femtocells.

In a system 100 according to an embodiment of the present invention, the data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the art, in most digital communications networks, the backhaul portion of a data communications network 102 may include intermediate links between a backbone of the network which are generally wire line, and sub networks or base stations 106a-e located at the periphery of the network. For example, cellular user equipment such as any of UE 108a-m communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100. In an embodiment, any of the network controller devices 110a-c and/or base stations 106a-e may function independently or collaboratively to implement processes associated with various embodiments.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
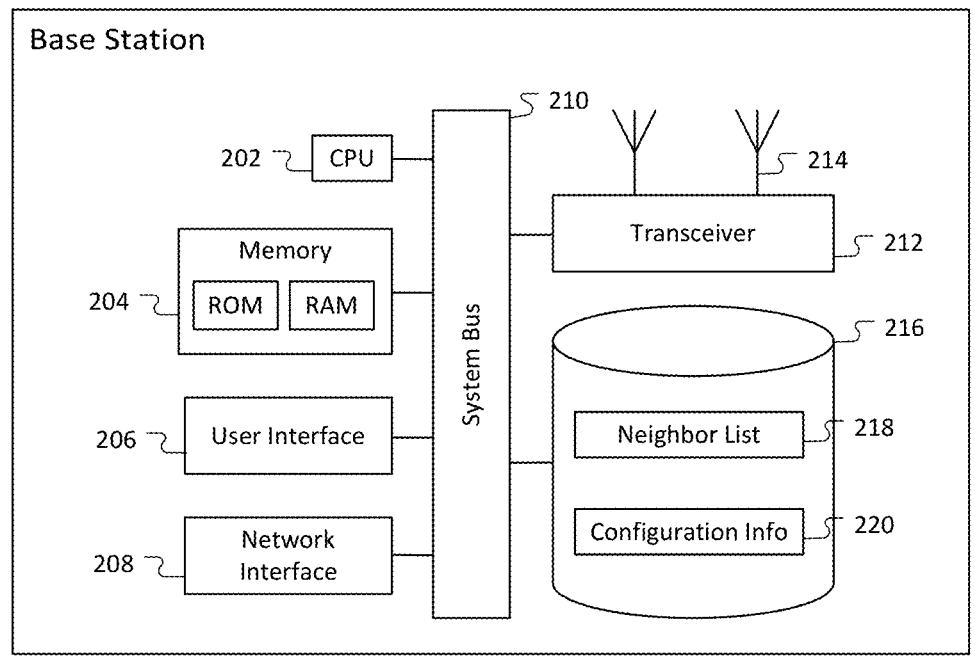
FIG. 2 illustrates a network resource controller according to an embodiment.

FIG. 2 illustrates a block diagram of a base station 200 that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send or receive a neighbor list and other information to or from an NRC. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data device 216 and CPU 202 which executes the program. In an embodiment, data storage 216 may store a neighbor list 218 and configuration information 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.) to send and receive information to and from UE through transceiver 212. Additionally, the base station 200 may be configured to communicate with UEs 108a-m via any Cellular Data Communications Protocol, including any common GSM, UMTS, WiMAX or LTE protocol.

Figure 3:
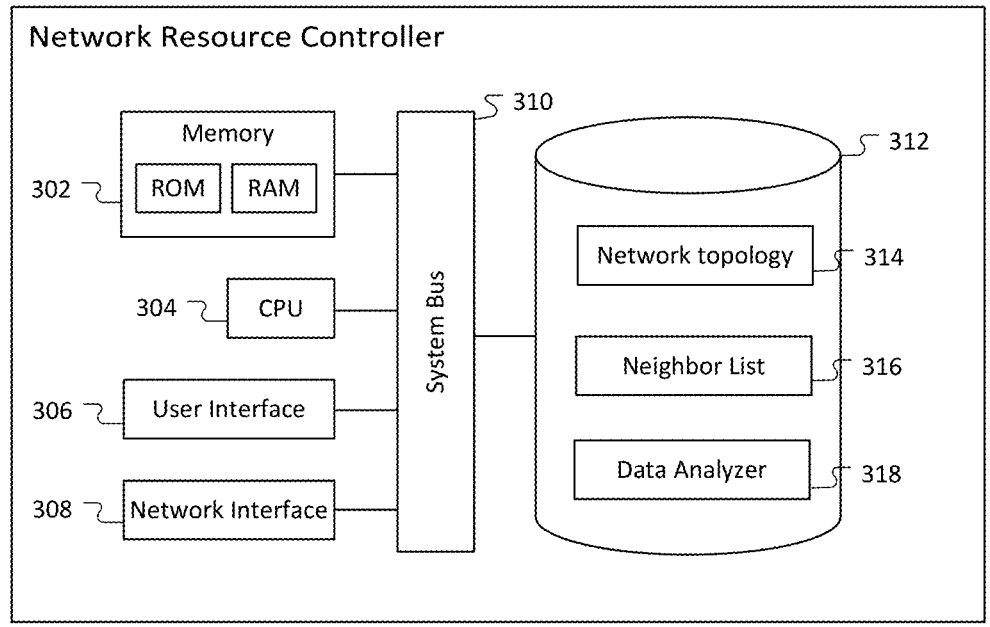
FIG. 3 illustrates a base station according to an embodiment.

FIG. 3 illustrates a block diagram of an NRC 300 that may be representative of any of the network controller devices 110a-c. In an embodiment, one or more of the network controller devices 110a-c are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may include network topology information 314, neighbor list information 316, and data analyzer 318. Data analyzer 318 may include program information for executing one or more form of data analysis described below, such as identifying candidate cells and evaluating test results.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto. In a wireless communications system, the NRC 300 may perform one or more tasks associated with Automatic Neighbor Relations (ANR).

Figure 4:
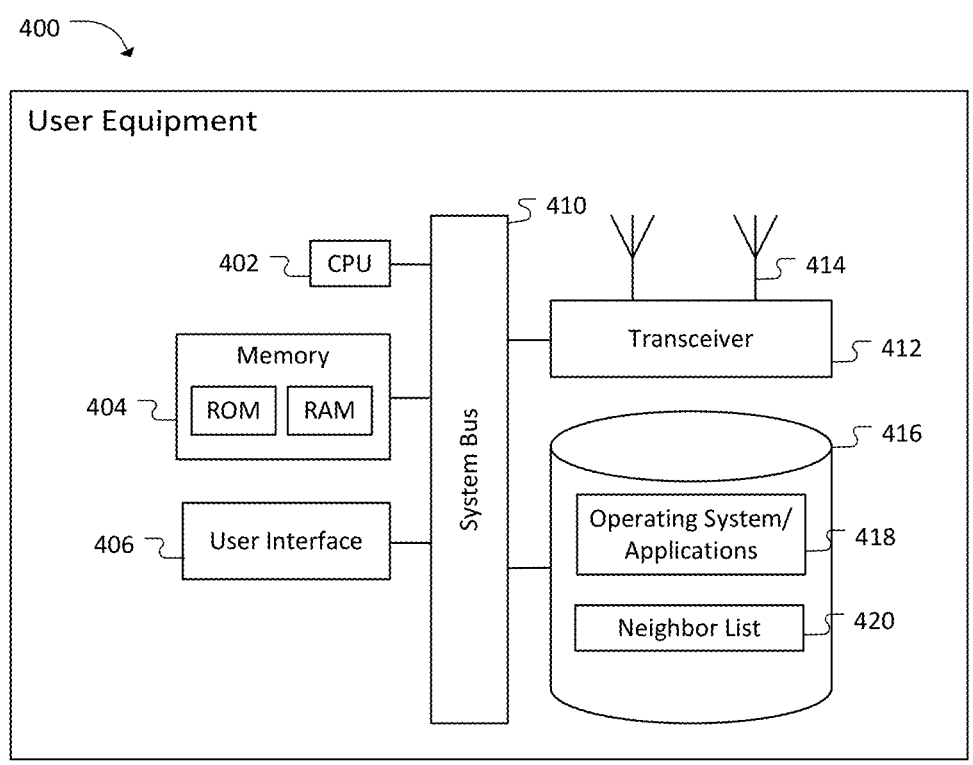
FIG. 4 illustrates user equipment according to an embodiment.

FIG. 4 illustrates a block diagram of user equipment 400 that may represent any of UEs 108 shown in FIG. 1. User equipment 400 may include a CPU 402, a memory 404, a user interface 406, a transceiver 412 including antenna 414, and storage device 416. Each of the components may communicate with one another through system bus 410. Storage device 416 may include operating system and applications 418 as well as neighbor list 420.

Figure 5:
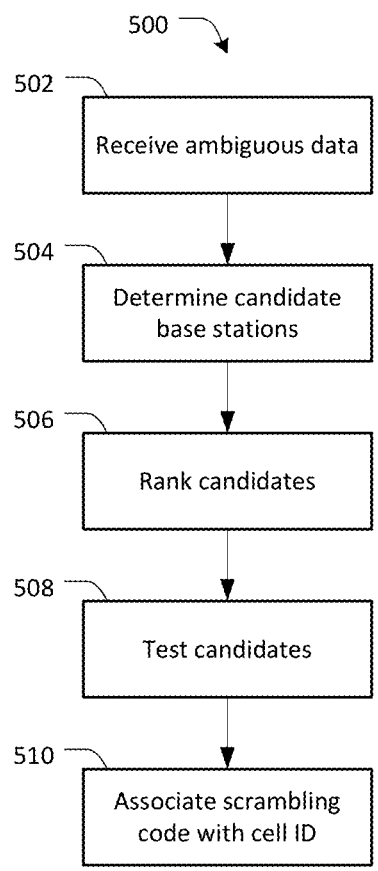
FIG. 5 illustrates a process for associating a cell with a detected scrambling code according to an embodiment.

FIG. 5 illustrates a process 500 for associating a scrambling code with a cell identifier according to an embodiment of the present invention. The process 500 begins with receiving ambiguous cell data in step 502. As used herein, the term "ambiguous cell data" refers to cellular data collected by one or more component of a cellular system for which there is some ambiguity between the data and the identity of a cell that is responsible for the data. Ambiguity is present when there is no relationship at all, and when there is information suggesting that an existing relationship may not be accurate. In various embodiments, ambiguous cell data may be received in different ways. Ambiguous cell data may be associated with a scrambling code conflict.

In many cellular telecommunication systems, data from various cells is received by user equipment. The user equipment may analyze the data and report the data and/or aspects of the data analysis to a data collection entity through the target cell to which the user equipment is attached. The cell data may include data that is collected for key performance indicator (KPI) reporting as part of one or more Detected Set Measurements (DSM).

Cellular technologies such as 3G may not transmit a unique cellular identifier along with signals received by user equipment. Therefore, cellular equipment may use a scrambling code to track which cells are responsible for reported cell data.

In one scenario, an NRC receives cell data with an associated scrambling code. When the scrambling code corresponds to the scrambling code of a cell on a neighbor list of the serving base station, the cell data is associated with the cell on the neighbor list. However, the user equipment may report cell data to an NRC with a scrambling code that does not appear on the neighbor list of the serving base station. In this case, the scrambling code that is not associated with a cell may be referred to as a detected scrambling code, and the associated cell data may be referred to as ambiguous cell data.

In another scenario, a scrambling code is associated with a first cell identifier on a neighbor list of a target cell, and UE attached to the target cell receive data from a second cell using the same scrambling code. In this scenario, the system may not be able to recognize that data associated with the scrambling code originates from two separate cells by analyzing the data. Ambiguous cell data may manifest through performance metrics such as a handover success ratio. In these circumstances, ambiguous cell data may be identified by analyzing a performance metric such as a handover success rate. The scrambling code may also be considered to be a detected scrambling code, since the cell with which it is associated is now considered to be ambiguous.

When ambiguous cell data is received through the target cell, in step 504, one or more candidate cell that is a candidate for being associated with the scrambling code is determined In an embodiment, step 504 includes conducting an area search based on existing network topology information to identify all cells within a predetermined area that utilize the same scrambling code.

In step 506, when a plurality of candidate cells have been identified, the candidate cells are ranked. In an embodiment, the ranking is based on the probability that the scrambling code is associated with a particular cell. Accordingly, ranking may be based on characteristics of the candidate cells such as distance and azimuth in relation to the target cell.

In step 508, candidate cells are tested. In one embodiment, a candidate cell is tested by associating a unique cell identifier with the scrambling code and collecting data from mobility operations. For example, each candidate cell's BSID may be temporarily associated with the scrambling code on a neighbor list of the target cell, and handover success metrics can be used to determine the appropriate candidate cell for associating with the code in step 510. In various embodiments, candidate cell testing may be performed in addition or as an alternative to ranking 506.

Figure 6:
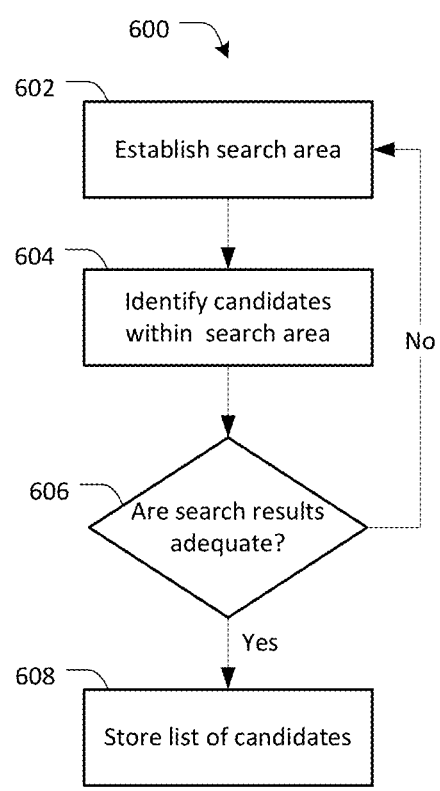
FIG. 6 illustrates an area search according to an embodiment.
Figure 7:
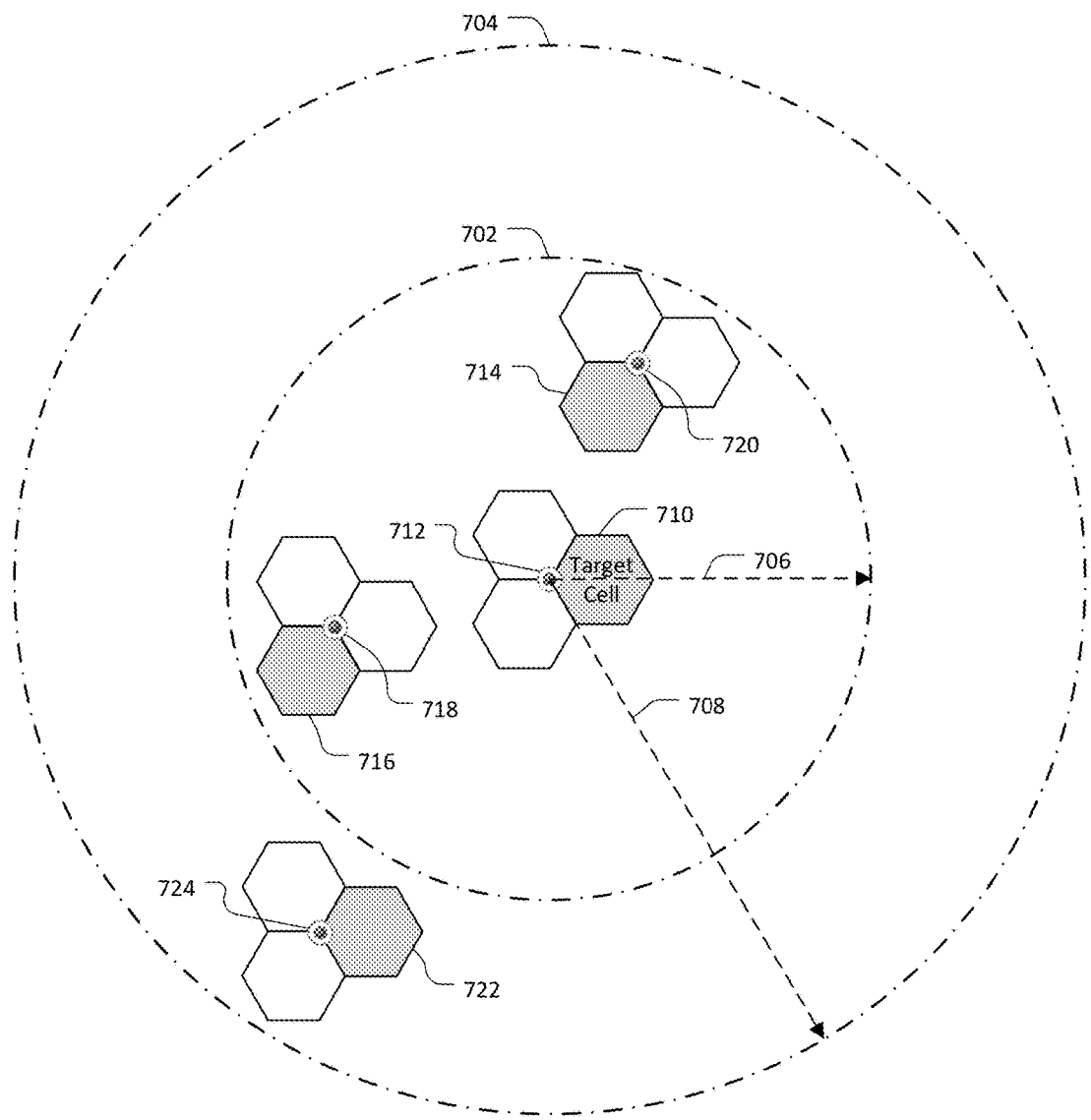
FIG. 7 illustrates an area search according to an embodiment.

FIGS. 6 and 7 illustrate processes for identifying candidate cells according to an embodiment. The processes of FIGS. 6 and 7 correspond to step 504 of identifying candidate cells discussed above.

A process 600 of identifying candidate cells is shown in FIG. 6. In step 602, a search area is established. In the embodiment of FIG. 7, search area 702 is established by determining a distance of first radius 704. Search area 702 is centered about base station 712 which is associated with target cell 710. Although search area 702 is a circular area, embodiments are not limited thereto. For example, in another embodiment the search area may be a rectangular area bounded by latitude and longitude offset values. In another embodiment, the center of the search area may be derived from the coverage area of the target cell.

In an embodiment that uses a circular search approach, a search radius 706 is defined centered on the base station of the target cell 702. All cells within this search radius 706 that utilize the detected scrambling code are considered candidates for subsequent hypothesis testing.

The size of the search area may be chosen based on local radio frequency propagation environment conditions. In an embodiment, the search area 702 is established so that it is large enough to reasonably expect to locate one or more cells utilizing the scrambling code in question. For example, in a typical light urban wireless network, an initial wide area search radius may be set to 20 km, while a dense urban area may have a lower value such as 5 km and a rural area may have a larger value such as 30 km.

In step 604, the identity of candidate cells within the search area are determined. In a specific embodiment, the BSID of base stations that are within the search area that are associated with cells using the detected scrambling code are determined In other words, an embodiment may use base station locations to determine whether a particular cell is within the search distance. In other embodiments, a value associated with a cell coverage area may be used to identify candidate cells within the search area.

In step 606, the search results are evaluated. In an embodiment, evaluating the search results includes comparing the number of candidate cells to a predetermined value, and if the number of candidate cells is less than the predetermined value, step 602 of may be repeated to establish a second search area. Accordingly, step 606 may ensure that there are an adequate number of candidate cells.

For example, if no candidate cells are present in first search area 702, then steps 602-606 may be repeated to establish a larger search area 704 based on distance 708 and evaluate the number of candidate cells in the larger search area 704. Steps 602 to 606 may be repeated until the number of candidate cells exceeds the predetermined value. When step 606 determines that search results are adequate, in step 608 a list of cell identifiers for the candidate cells within the most recent search area is recorded in a memory.

In another embodiment, in process 606 the predetermined value to which the number of candidate cells within the search area is compared is a maximum value. In such an embodiment, when the number of cells in the search area exceeds the predetermined maximum value, steps 602-606 are repeated to reduce the search area by increments until step 606 determines that the number of candidate cells in a current search area is less than the maximum value. In an embodiment, both a maximum value and a minimum value are used, and the size of the search area may be incremented down or up until the maximum and minimum conditions are satisfied.

In an embodiment, determining whether search results are adequate 606 may include analyzing test results from step 508 of FIG. 5. In such an embodiment, candidate cells are tested to evaluate a probability of whether each candidate cell is the source of the detected scrambling code. If the test results suggest that none of the candidate cells are the source of the signal responsible for the detected scrambling code, then step 606 may determine that search results are not adequate, and processes 602 to 608 may be performed again with a larger search area.

An example of process 600 will now be explained with respect to FIG. 7. In this example, the predetermined value is three, and cells which use the detected scrambling code include cells 714 and 716. Process 602 establishes search area 702 using radius 706, and information related to cells 714 and 716 including identifiers of the associated base stations 718 and 720 are returned as search results.

Process 606 determines that the search results are not adequate because the two BSIDs is less than the predetermined value. Accordingly, step 602 is repeated to establish search area 704 based on radius 708. The new search area 704 includes base station 724 associated with cell 722 which uses the detected scrambling code. Therefore, in such an embodiment, step 606 determines that search results are adequate.

Figures 8, 9:
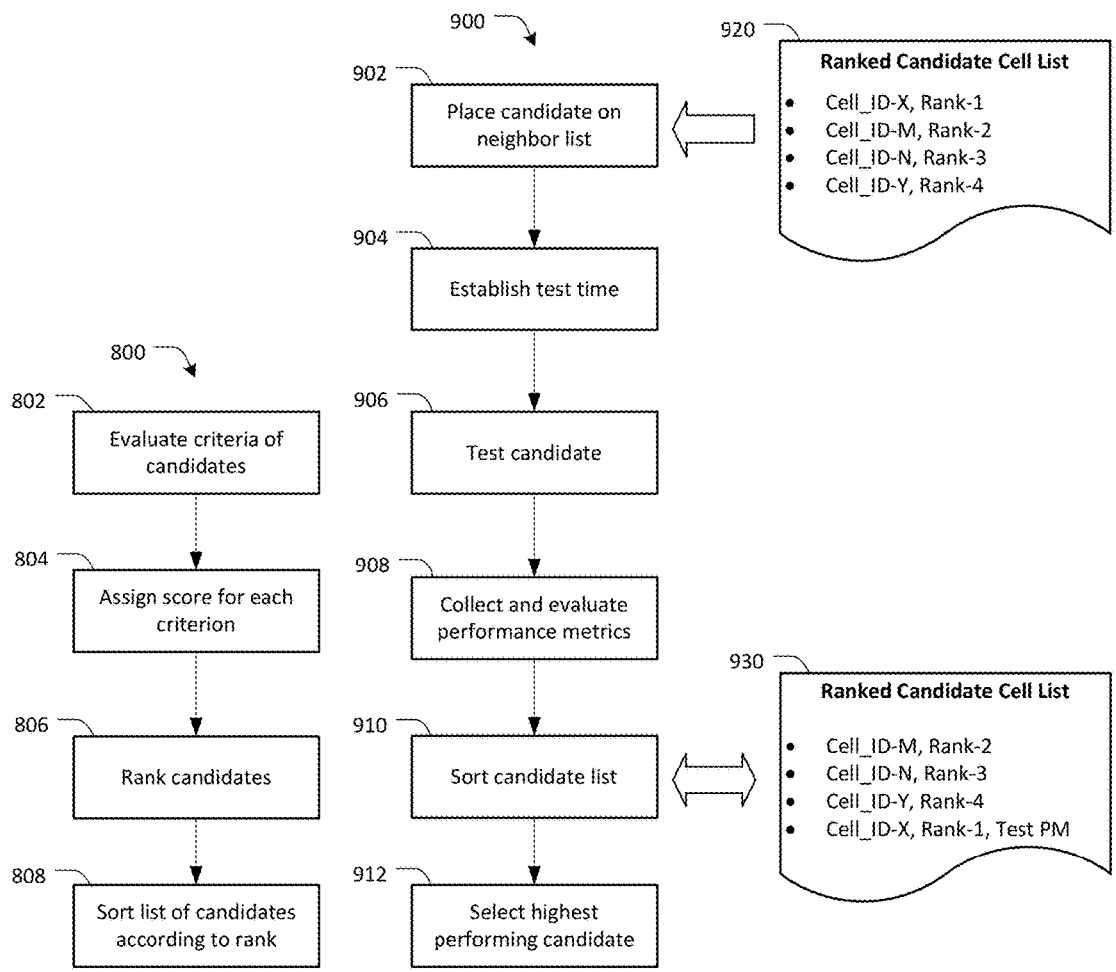
FIG. 8 illustrates candidate ranking according to an embodiment.
FIG. 9 illustrates testing candidate cells according to an embodiment.

FIG. 8 illustrates a process 800 for evaluating candidate cells according to an embodiment. The process of FIG. 8 corresponds to step 506 of ranking candidate cells discussed above.

When multiple candidate cells are detected in process 600, the candidates may be ranked according to one or more criteria in process 800. In step 802, one or more criterion is evaluated for each candidate cell. Each criterion is selected based on a correlation to the probability that the candidate cell is responsible for the detected scrambling code.

For example, one criterion may be distance from the target cell. Signals from base stations that are further from the target cell are generally more attenuated than signals from closer base stations, and therefore are less likely to be detected by user equipment attached to the target cell than closer base stations. Thus, excluding other variables, a closer candidate cell has a higher probability of being responsible for a detected scrambling code than a further cell. Therefore, in this example of step 804, a candidate cell that is closer to the target cell is assigned a higher score than a candidate cell that is farther than the target cell, and the criteria itself (distance from target cell) relates to a probability that a given cell is responsible for a detected scrambling code.

In various embodiments, one or more criterion may be evaluated in step 802. Each criterion may be related to the probability that a given candidate is responsible for a detected scrambling code. A non-exhaustive list of criteria that may be evaluated in in step 802 includes:

Geographic location of candidate cell such as latitude and longitude coordinates or similar position information;
Antenna characteristics such as Height Above Average Terrain, absolute height, boresight pointing angle, azimuth and elevation beam profiles, downtilt, gain, etc.;
Associated base station transmission power characteristics such as total transmit power, pilot power, etc.;
Terrain and clutter data along propagation path from target cell such as GIS terrain data, foliage category, urban, suburban, rural, over water, etc.

Step 802 may include further evaluation of one or more characteristics of a candidate cell to generate additional criteria. For example, the location of a candidate cell can be used to calculate a distance between the candidate cell and the target cell, and this distance may be used as an evaluation criterion. Other examples of criteria that can be calculated using cell characteristics are predicted received energy such as Received Signal Strength Indication (RSSI) and Received Signal Code Power (RSCP), which may be calculated from each candidate cell with respect to at least a portion of the coverage area of the target cell using standard radio frequency propagation modeling approaches, and predicted received signal quality (e.g. Ec/Io, Carrier to Interference plus Noise Ratio (CINR), etc.), which may be calculated for each candidate cell with respect to at least a portion of the coverage area of the target cell using a radio frequency propagation modeling technique. Persons of skill in the art will recognize that this list of examples is not exhaustive, and that other specific criteria for ranking candidate cells are within the scope of embodiments of the present invention.

In step 804, a score may be assigned to candidate cells for each criterion evaluated in step 802. The scores may be used to assign rank to the candidate cells in step 806. In an embodiment, the scores, and therefore the rank, correspond to the probability that the associated candidate cell is responsible for the detected scrambling code. A list of candidate cells may be sorted according to rank in step 808.

In an embodiment, ranking may use categories instead of or in addition to individual rank values. For example, each candidate cell identified by a search may be assigned to a category depending on the probability that it is responsible for the detected scrambling code. One embodiment uses two categories such as "Test" and "Do_Not_Test," and subsequent testing is performed or not performed for a candidate cell based on categorization. Multiple categories are possible as well, which may be used to determine priority in subsequent test processes.

In an embodiment, a category may be an exclusion category. For example, one or more criterion of a candidate cell may be compared to a predetermined value, and the candidate cell may be removed from the list of candidate cells based on the results of the comparison.

In some embodiments, the evaluation of process 800 may be adequate to associate a BSID of a candidate cell with the detected scrambling code. For example, a result of searching process 600 may be that a small number of candidate cells are within a large distance from the target cell, and process 800 of evaluating the candidate cells may reveal that only one of the candidate cells has characteristics consistent with the ambiguous data.

However, it is possible to identify multiple candidate cells with similar characteristics. In such a case, it is possible to perform tests with respect to the candidate cells in order to determine which candidate cell is most likely to be associated with the detected scrambling code. In an embodiment, candidate cell testing is accomplished by temporarily placing each candidate cell on the target cell's neighbor list and monitoring subsequent handover attempts, successes and failures for the overall target cell neighbor list and the specific handover performance metrics associated with the candidate cell under test.

FIG. 9 illustrates a process 900 for testing candidate cells according to an embodiment. Process 900 corresponds to step 508 of testing candidate cells discussed above.

In step 902, a candidate cell is placed on the active neighbor list of the base station of the target cell. Each candidate cell on the ranked candidate list 920 may be tested sequentially by associating it with the detected scrambling code and placing it on the active neighbor list of the target cell.

In process 904, a test time may be established, and each candidate cell may be tested for the test time. In some embodiments, this time may be one or more performance metrics reporting periods configured for the wireless network. For example, values of 15 minute reporting or 1 hour reporting may result in test times in a range of one to several hours or even a full day, which may further depend on system activity and time to collect representative performance data.

In an embodiment, each candidate cell is tested in process 906. Testing may include maintaining a candidate cell on an active neighbor list of the target cell for the test time established in step 904. Each cell on a list of candidate cells 920 may be tested for the test time in order of descending rank.

In step 908, one or more performance metrics are collected and evaluated for each test. Performance metrics may include a number of handover attempts, a number of handover successes, a number of handover failures, and a handover success ratio. Each of the collected performance metrics is saved to a memory. After collecting performance data for cells on the list of candidate cells, the collected performance data may be evaluated by comparing metrics collected from each cell to one another or by comparing the performance data to a predetermined value.

In an embodiment, if an insufficient number of handovers are attempted to the candidate cell under test or the handovers attempted fail at an unacceptable rate, the candidate may be removed from the neighbor list and the testing metrics (e.g. handover attempts, test duration, handover successes, handover failures) are stored. Then the next highest ranked candidate cell is placed on the target cell's neighbor list and tested for the defined test time. This process may be repeated for each candidate cell on the candidate list or within a category of the list.

In step 910, the candidate cell list 920 may be sorted to become candidate cell list 930. Sorting the candidate list may include adjusting the order of cells on the list to place the most recently tested cell on the bottom of the list while the next cell to be tested is moved to the top position. In some embodiments, sorting the candidate cell list includes removing a candidate cell from the list, for example when no handover attempts are successful in a test. Such a candidate cell may be blacklisted from further consideration as a candidate.

In step 912, the candidate cell with the highest performance may be chosen as the best candidate. The highest performing candidate may be selected based on a number of handover failures, a number of handover successes, or handover success rate. Accordingly, the highest performing candidate may be associated with the detected scrambling code for ANR processes. However, in an embodiment, performance metrics of each tested candidate cell may be compared to a threshold value, and the result of the comparison may be a determination that no suitable candidate was identified by the test.

If no candidate cells successfully pass the testing phase each cell may be retested by repeating one or more steps of process 900. In an embodiment, when no successful candidates are identified, one or more aspects of process 600 may be performed across a larger area in order to identify additional candidate cells for testing. Testing may be repeated several times before repeating an area search.

Detected Set Measurements may be reviewed between each iteration of the testing and/or area searching to determine if the Detected Set Measurements continue to report the same detected scrambling code. One or more exit criteria may be defined, such as a fixed number of hypothesis testing cycles, a maximum search area dimension, and exit without results when the Detected Set Measurements no longer contain the detected scrambling code.

The testing process 900 may be performed in addition or as an alternative to the process 800 of ranking candidate cells.

Some embodiments may use a time efficient process of associating the first candidate cell to achieve a particular performance threshold with the detected scrambling code. For example, the first candidate cell to successfully complete 100 handovers during the test period may be used to resolve the detected scrambling code. Additional operations policies may also be considered, for instance never selecting certain cells based on operational policies such as maximum distance between cells, and may result in operator alerts being generated, such as an excessive neighbor cell distance warning.

Various embodiments may repeat some or all of the steps of test process 900 in order to collect additional test samples. In an embodiment, candidate cells with little to no successful handovers or handover attempts are eliminated, and remaining candidate cells may be repeatedly tested until statistical confidence intervals on test sampling are achieved relative to system activity. For example, the testing cycle may be repeated until the target cell has successfully completed a minimum number of handovers to establish that each candidate cell has had sufficient opportunity to be detected by mobile devices attached to the target cell. In such an embodiment, the testing cycle may be repeated until a large number of handover successes (e.g. 1,000, 10,000, etc.) have occurred at the target cell and only consider candidates with at least a minimum percentage of those attempts as valid candidates. For example, in various embodiments, valid candidates for continued testing may be required to have at least 0.1% or 0.5% or 1% of total handover attempts as a fraction of total handover attempts at the target cell.

Although aspects of the present invention have been described with respect to specific examples, embodiments are not limited to these examples. Persons of skill in the art will recognize that other embodiments are within the scope of the present disclosure.

What is claimed is:

1. A system for associating a cell with a detected scrambling code in a cellular communications network, the system comprising:
   a processor;

a memory; and a non-transitory computer readable medium with computer executable instructions stored thereon which, when executed by a processor, perform the following steps:

receiving cell data associated with the detected scrambling code;

determining a set of candidate cells within a predetermined area;

evaluating characteristics of each candidate cell of the set of candidate cells by testing a candidate cell of the set of candidate cells by:

placing a base station identifier (BSID) of the candidate cell with the detected scrambling code on a neighbor list of a target cell;

collecting the at least one handover metric based on handovers to the cadidate cell; and evaluating the at least one handover metric; and associating a cell identifier of a first candidate cell of the set of candidate cells with the detected scrambling code based on the evaluated characteristics, wherein the neighbor list is a list of handover targets provided to user equipment served by the target cell.

2. The system of claim 1, wherein the cell data received for the target cell is Detected Set Reporting (DSR) information for a Universal Mobile Telecommunications System (UMTS) cellular network.

3. The system of claim 1, wherein determining the set of candidate cells within the predetermined area includes:
establishing the predetermined area; and
adding each cell that uses the detected scrambling code within the predetermined area to the set of candidate cells.

4. The system of claim 1, wherein determining the set of candidate cells within the predetermined area includes:
establishing a first predetermined area;
comparing a number of cells that use the detected scrambling code within the first predetermined area to a predetermined value;
when the number of cells that use the detected scrambling code within the first predetermined area is less than the predetermined value, determining a second predetermined area that is larger than the first predetermined area; and
adding each cell that uses the detected scrambling code within the second predetermined area to the set of candidate cells.

5. The system of claim 1, wherein testing the candidate cell further comprises:
establishing a test time, wherein testing the candidate cell is performed for the test time.

6. The system of claim 1, wherein evaluating characteristics of each candidate cell of the set of candidate cells further includes:
evaluating one or more criterion related to a probability that a given cell is responsible for the cell data; and
ranking each cell in the set of candidate cells based on the one or more criterion.

7. The system of claim 6, wherein the one or more criterion includes a geographic location and antenna characteristics of each candidate cell.

8. The system of claim 6, wherein the one or more criterion includes at least one of predicted received energy and predicted received signal quality.

9. A method for associating a cell with a detected scrambling code in a cellular communications network, the method comprising:

receiving cell data associated with the detected scrambling code;

determining a set of candidate cells within a predetermined area;

evaluating characteristics of each candidate cell of the set of candidate cells by testing a candidate cell of the set of candidate cells by:

placing a base station identifier (BSID) of the candidate cell with the detected scrambling code on a neighbor list of a target cell;

collecting at least one handover metric based on handovers to the candidate cell; and evaluating the at least one handover metric; and associating a cell identifier of a first candidate cell of the set of candidate cells with the detected scrambling code based on the evaluated characteristics, wherein the neighbor list is a list of handover targets provided to user equipment served by the target cell.

10. The method of claim 9, wherein the cell data received for the target cell is Detected Set Reporting (DSR) information for a Universal Mobile Telecommunications System (UMTS) cellular network.

11. The method of claim 9, wherein determining the set of candidate base stations within the predetermined area includes:
establishing the predetermined area; and
adding each cell that uses the detected scrambling code within the predetermined area to the set of candidate cells.

12. The method of claim 9, wherein determining the set of candidate cells within the predetermined area includes:
establishing a first predetermined area;
comparing a number of cells that use the detected scrambling code within the first predetermined area to a predetermined value;
when the number of cells that use the detected scrambling code within the first predetermined area is less than the predetermined value, determining a second predetermined area that is larger than the first predetermined area; and
adding each cell that uses the detected scrambling code within the second predetermined area to the set of candidate cells.

13. The method of claim 9, wherein testing the candidate cell further comprises:
establishing a test time, wherein testing the candidate cell is performed for the test time.

14. The method of claim 9, wherein evaluating characteristics of each candidate cell of the set of candidate cells further includes:
evaluating one or more criterion related to a probability that a given cell is responsible for the cell data; and
ranking each cell in the set of candidate cells based on the one or more criterion.

15. The method of claim 14, wherein the one or more criterion includes a geographic location and antenna characteristics of each candidate base station.

16. The method of claim 14, wherein the one or more criterion includes at least one of predicted received energy and predicted received signal quality.

17. A non-transitory computer readable medium with computer executable instructions stored thereon which, when executed by a processor, perform the following steps:
receiving cell data associated with a detected scrambling code;
determining a set of candidate cells within a predetermined area;

evaluating characteristics of each candidate cell of the set of candidate cells by testing a candidate cell of the set of candidate cells by;
  placing a base station identifier (BSID) of the candidate cell with the detected scrambling code on a neighbor list of a target cell;
  collecting the at least one handover metric based on handovers to the candidate cell; and
  evaluating the at least one handover metric; and
associating a cell identifier of a first candidate cell of the set of candidate cells with the detected scrambling code based on the evaluated characteristics,
wherein the neighbor list is a list of handover targets provided to user equipment served by the target cell.

18. The computer readable medium of claim 17, wherein determining the set of candidate cells within the predetermined area includes establishing the predetermined area and adding each cell that uses the detected scrambling code within the predetermined area to the set of candidate cells.

19. A system for associating a cell with a detected scrambling code in a cellular communications network, the system comprising:
  a processor;
  a memory; and
  a non-transitory computer readable medium with computer executable instructions stored thereon which, when executed by a processor, perform the following steps:
    receiving cell data associated with the detected scrambling code;
    determining a set of candidate cells within a predetermined area;
    evaluating characteristics of each candidate cell of the set of candidate cells; and
    associating a cell identifier of a first candidate cell of the set of candidate cells with the detected scrambling code based on the evaluated characteristics,
    wherein determining the set of candidate cells within the predetermined area includes:
      establishing a first predetermined area;
      comparing a number of cells that use the detected scrambling code within the first predetermined area to a predetermined value;
      when the number of cells that use the detected scrambling code within the first predetermined area is less than the predetermined value, determining a second predetermined area that is larger than the first predetermined area; and
      adding each cell that uses the detected scrambling code within the second predetermined area to the set of candidate cells.

20. A method for associating a cell with a detected scrambling code in a cellular communications network, the method comprising:
  receiving cell data associated with the detected scrambling code;
  determining a set of candidate cells within a predetermined area;
  evaluating characteristics of each candidate cell of the set of candidate cells; and
  associating a cell identifier of a first candidate cell of the set of candidate cells with the detected scrambling code based on the evaluated characteristics,
  wherein determining the set of candidate cells within the predetermined area includes:
    establishing a first predetermined area;
    comparing a number of cells that use the detected scrambling code within the first predetermined area to a predetermined value;
    when the number of cells that use the detected scrambling code within the first predetermined area is less than the predetermined value, determining a second predetermined area that is larger than the first predetermined area; and
  adding each cell that uses the detected scrambling code within the second predetermined area to the set of candidate cells.

* * * * *